March 11, 1930.  H. H. HELLER  1,749,939
INSULATION REMOVING PROCESS
Filed Jan. 2, 1926   2 Sheets-Sheet 1

INVENTOR
BY Shirley H. Heller
Moakley and Gill
ATTORNEYS

March 11, 1930. H. H. HELLER 1,749,939
INSULATION REMOVING PROCESS
Filed Jan. 2, 1926  2 Sheets-Sheet 2
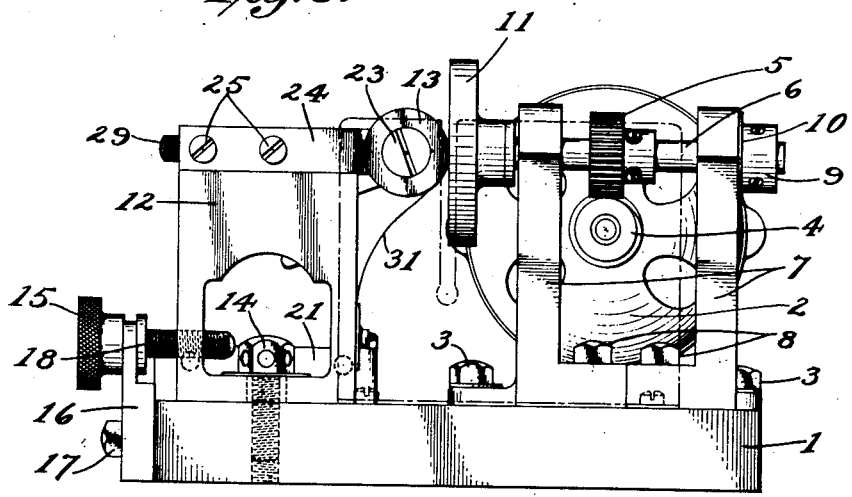
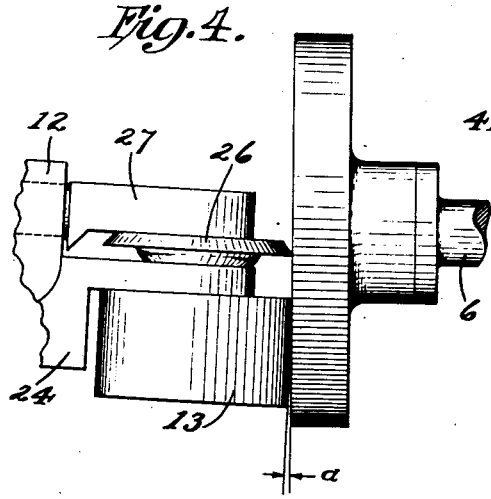
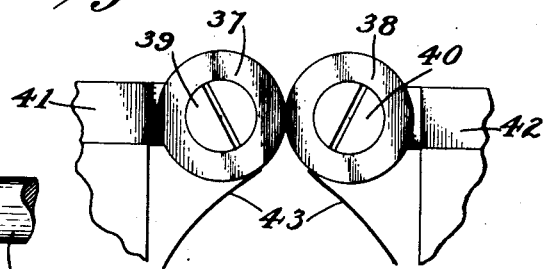
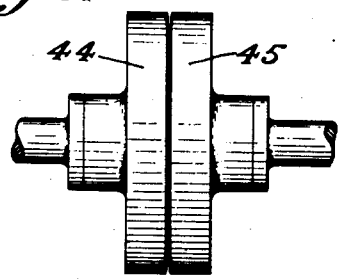
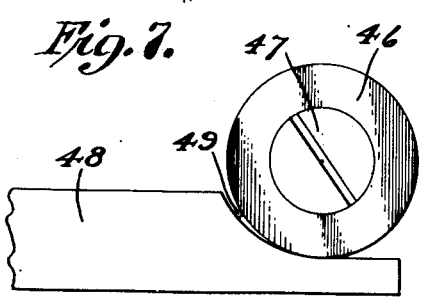
INVENTOR
Harley H. Heller
BY Mosley and Gill
ATTORNEYS Patented Mar. 11, 1930

1,749,939

UNITED STATES PATENT OFFICE

HARLEY H. HELLER, OF RIVERSIDE, CONNECTICUT, ASSIGNOR TO FORD INSTRUMENT COMPANY, INC., OF LONG ISLAND CITY, NEW YORK, A CORPORATION OF NEW YORK

INSULATION-REMOVING PROCESS

Application filed January 2, 1926. Serial No. 79,011.

This invention relates to the mechanical removal or stripping from wire of insulating coatings which are originally applied in a fluid condition, in order to prepare the wire for soldering or brazing to other electrical conductors.

The principal object of this invention is to provide a simple, rapid and effective process and apparatus for the proper preparation of wire, without injury thereto, for the subsequent soldering process, without the necessity of touching the prepared wire with the hands.

It is well known to those familiar with the art, that wound units of electrical conducting strands are often made of wire to which an insulating coating of varnish, enamel or equal, has been applied by a dipping or spraying process, or the like. In the art of making small coils, for radio apparatus for example, very fine enamel- or varnish-coated wire is frequently used. This coating must be removed from the intended electrical contact areas without material injury to the wire proper, before an effective electrical connection can be effected by soldering or any other process of joining materials electrically for the purpose of attaching lead wires or the like.

Heretofore, the preparation of enamelled or varnished wire for soldering has required the removal by hand work of the insulation coating by scraping, brushing or grinding, or by the use of abrasive materials, such as sand paper or emery cloth. These processes often cause injury to the wire, as by nicking particularly if done with a knife, or by the unnecessary removal of some of the material of the wire along with the insulating coating, whereby its strength and effectiveness are impaired to a considerable degree, particularly in the finer wires. Moreover, the exposed surfaces of the majority of wire materials, such as copper for example, are highly susceptible to the accumulation of foreign matter, such as deposits from soiled hands and implements or particularly from the unavoidable natural excretions from the operator's hands, which materially decreases the effective area of the prepared surfaces so that a proper bond between it and the solder is virtually impossible without the subsequent step of cleaning by immersion in a cleansing bath of strong alkalies, acids or the like. Furthermore, the excretions from the hands have a subsequent effect on an apparently good soldered joint, whereby the deposited body acids cause the disintegration of the joint at a considerably later time, which may finally result in a damaged and consequently poor electrical connection. By this invention and in one operation the wire leaves the machine with its strength virtually unimpaired, and clean and ready for soldering without the necessity of additional preparatory operations, whereby the otherwise aforementioned uncertainties would have to be eliminated.

One type of apparatus for effecting the process disclosed by this invention consists essentially of coacting relatively moving members such as rotating rollers, discs, or a combination of discs, rollers, or stationary members set at a slight angle, between which the coated wire is passed, whereupon the coating is removed by a combined slight rolling and rubbing action from a sufficient area of the surface of the wire to provide for the proper and effective joining to other surfaces, as by soldering, brazing or any electrical process. A cutting-off member coacts with the coating removing means whereby the wire is cut off at the proper length desired.

Other advantages and objects of this invention will become apparent upon examination of the accompanying drawings illustrating a preferred embodiment of an apparatus for effecting the invention and described hereinafter. In the drawings, in which like reference characters designate like parts in the several views and modifications;

Fig. 3 is a front elevation of the apparatus shown in Fig. 1;

Fig. 4 is an enlarged view of the insulation removing and cutting-off members;

Figs. 5, 6 and 7 are modifications of the same; and

Figure 1:
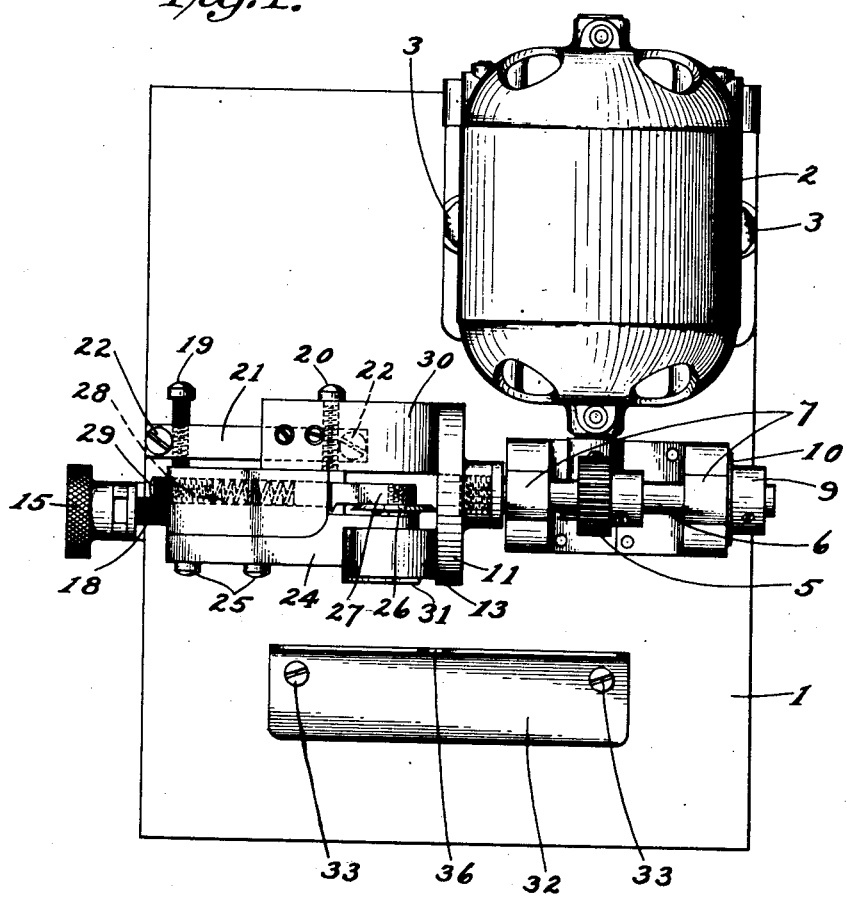
Figure 1 is a plan view of an apparatus for removing the insulation from wire.

Referring particularly to Figs. 1 and 3, numeral 1 designates the base plate upon which the apparatus is assembled and mounted. Motor 2 is mounted on base plate 1 by tap screws 3, and has a worm 4 integral with its armature shaft which drives at a reduced speed a worm wheel 5 mounted on a shaft 6 which is journalled in standards 7 screwed to base 1 by means of tap screws 8. The shaft 6 is positioned by collar 9 bearing on washer 10, and carries friction disc 11 at its other end, so that the rotation of the motor armature causes the rotation of disc 11 at a reduced speed.

A variably positionable carriage 12 carries a roller 13 which coacts with disc 11 to make the two relatively moving friction members required for the accomplishment of this invention. A screw 14 is tapped into base plate 1 through a larger hole in the base of carriage 12 whereby it is shiftable about screw 14. The frictional contact of roller 13 is adjustable by means of thumb-screw 15, which is mounted in a bifurcated bracket 16 attached to base plate 1 by means of screw 17, so that the turning of threaded shank 18, which is threaded into carriage 12, causes a movement of carriage 12 relatively to the base plate 1 and consequently varies the relation of roller 13 to disc 11. The angular relation of roller 13 to disc 11 is variable by means of screws 19 and 20 threaded through block 21 which is rigidly mounted on the base plate 1 by means of screws 22. The adjustment of screws 19 and 20 causes movement of carriage 12 about screw 14 to effect the angular relation of roller 13 to disc 11 as shown in an exaggerated manner by angle $a$ in the enlarged view of Fig. 4. The roller 13 is revolved about pin 23 which is tapped into a bar 24 attached to carriage 12 by screws 25, and may or may not normally contact with disc 13, depending upon the size of the wire. As shown in the drawings, the disc and roller are set for fine wire, so that the roller 13 bears against the disc 11 near its center, which causes roller 13 to revolve as disc 11 revolves, but such contact is obviously unnecessary to the operation of the device since there is no normal contact when the disc and roller are set for larger gauge wire.

For the purpose of trimming off the ends of the wire, a rotary disc knife 26 is provided, which bears against the surface of disc 11 so as to rotate therewith. The knife 26 is mounted on bar 27 which forms a fork with bar 24, knife 26 being interposed in the bifurcation. The frictional contact of knife 26 to disc 11 is maintained by coiled spring 28 in a circular hole in carriage 12, the tension of the spring being adjustable by the screw stud 29 threaded into the end of the carriage 12. Bar 27 is slidable in the hole and is continually pushed outwardly by spring 28.

The enamel or varnish which is removed from the wire by the rolling and rubbing action of disc 11 and roller 13, when the wire is passed between them, tends to stick to the surfaces of the roller and disc. In order to keep the disc and roller clean for the proper frictional coaction, scrapers are provided which prevent the accumulation of the varnish or enamel on their surfaces. Such scrapers are member 30 for disc 11 and member 31 for roller 13, both preferably of flexible springy material, and which are rigidly mounted at one end to the carriage 12, so that the free end constantly bears against the surfaces of the disc and roller.

In order to remove the insulation uniformly from wires of the same kind and to trim them to the proper length, a guide 32 is preferably provided which is fastened to base plate 1 by screws 33, as shown in Fig. 1 and in phantom in Fig. 3. For example, suppose the radio transformer coil shown in Fig. 2 and designated 34 were to be prepared for soldering lead wires to the terminal 35 of the winding of enamelled wire. Accordingly, the terminals 35 are inserted in the slot 36 of the guide 32 so that they protrude through the slot in a horizontal manner. By moving the whole coil 34 downwardly the terminals 35 are caught between the revolving roller 13 and disc 11 and stripped of insulation and trimmed.

Referring now to Fig. 5 in which a modification of the above described apparatus for effecting the invention is illustrated, two coacting rollers 37 and 38 are shown, one or both of which may be driven by any means preferred. As described above in connection with disc 11 and roller 13, the same angular relation exists between them, although not shown in Fig. 5, whereby a V-shaped space is provided between them for the purposes disclosed. The rollers 37 and 38 are mounted similarly to roller 13, being rotatable on pins 39 and 40, and on bars 41 and 42, respectively, each roller having a surface scraper 43 for the purpose set forth. The rollers 37 and 38 are made relatively adjustable so that the space between them may be varied as required for various wire gauges.

In Fig. 6 another modification is illustrated in which two discs 44 and 45, one or both of which may be driven in the manner described in connection with disc 11, are mounted face-to-face so as to coact. As illustrated, the faces of the discs are preferably made conico-convex so that the above-described V-shaped space is formed between them. It is understood that either disc may be convex and one flat, or both may be flat, as desired, and that the space between the discs is variable according to the gauge of the wire to be stripped.

In Fig. 7 another modification is illustrated in which a driven roller 46 mounted on pin 47 revolves on a member 48 having a portion shaped so as to receive roller 46, and which provides a surface of a slightly greater curvature than the radius of roller 46 as shown. The wire 49 to be stripped is accordingly inserted between roller 46 and member 48 and parallel to the axis of roller 46, so that the rolling and rubbing action is applied to the wire whereby the insulation is removed from its surface.

Having explained the function of the invention and described a preferred embodiment of a machine for effecting the same as well as several modifications thereof, the process will now be further disclosed in detail. In the embodiment and modifications of an apparatus for effecting the invention herein described, the coaction of relatively moving members, between which the wire to be stripped is passed, causes a combined rubbing and rolling of the wire which removes the insulating coating therefrom. The slightly angular space between the coacting members, which is arranged so that the pressure on the wire is greatest at its extremity and virtually negligible at the base of the stripped length, causes the greater amount of insulation to be removed from the end of the wire and a decreasing amount toward the base of the stripped length, as well as a flattening action which increases in intensity toward the end of the wire from none at the base of the stripped length, causing the resultant terminal shown in exaggerated form in Fig. 8 in which typical cross-sections are illustrated. Consequently the wire is not nicked or otherwise mutilated where its strength should be, and the greatest exposed area of wire material is at the slightly flattened end of the wire, where it likewise is desired to be for effective soldering. Experiments have shown that the aforementioned deformation of the end of the wire impairs the strength thereof but little compared to the existing methods of removing insulation coating from the wire, whereby the greater strength of the wire is often lost because of mutilation.

Accordingly, the machine illustrating the preferred embodiment of this invention has been designed so that the co-acting relatively moving members effect the above described combined rolling and rubbing action of this invention upon the length of wire to be stripped of its insulating coating, and the relation of the members to each other provides the V-shaped space, which obviously may be modified as desired, either to be more obtuse, acute, or parallel.

Figures 2, 8:
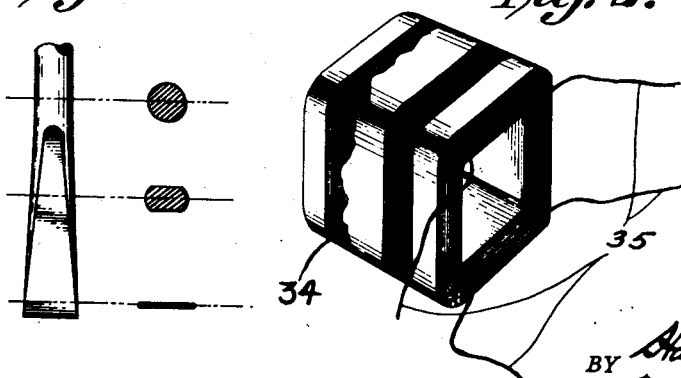
Fig. 2 is an example of a coil made of enamelled wire, the terminals of which may be prepared for soldering in accordance with the disclosure of this invention.
Fig. 8 is a magnified and exaggerated view and typical cross-sections of a wire from which the insulation has been removed in accordance with this invention.

In order to describe the operation of one form of a machine for effecting the invention, reference is made particularly to the embodiment shown in Figs. 1, 3 and 4 of the drawings, in which disc 11 is driven through speed reducing worm and wheel 4 and 5, respectively, by motor 2, and acts as one of the stripping members. When it is desired to remove the insulating coating from fine wires, such as the coil shown in Fig. 2 is made of for example, roller 13 is necessarily set so close to disc 11 that the inner edge of roller 13 contacts with disc 11 near its center, so that roller 13 is frictionally driven by disc 11 as it is rotated by motor 2. It is obvious that for larger gauge wire, roller 13 will normally remain stationary, moving only when a wire is passed between it and rotating disc 11, since the wire establishes the frictional contact between disc 11 and roller 13. The circular cutting-off blade 26 rotates as disc 11 rotates, being driven by the frictional contact with the disc.

The ends of the wire, such as the terminals 35 of coil 34, for instance, are passed downwardly through slot 36 of guide 32 and parallel to the face thereof so that the wires extend horizontally over the junction of disc 11 and roller 13. As the wire is carried downward by manual means, or any of the mechanical carriers well known in the art, it is caught between the roller 13 and disc 11, and, by the combined rolling and frictional rubbing action between the disc 11 and roller 13, occasioned in this instance by the difference in the relative speeds between them at various points on the line of contact of the roller 13 with the disc 11 through the agency of the wire, the insulation coating is effectively rubbed and rolled off. Scrapers 30 and 31 remove the accumulated rubbed-off insulating coating from the surfaces of disc 11 and roller 13, respectively. Thus the insulating coating is effectively removed from the wire without making it necessary to touch the stripped ends with the hands or implements, whereby the stripped surfaces remain clean and in excellent condition for immediate soldering.

The various modifications show the same principle of operation, disclosed by this invention whereby the insulating coating is stripped from the wire by relative movement between frictionally coacting members when the wire is inserted between them, namely, in Fig. 5 the relative motion takes place between rollers 37 and 38, one or both of which may be driven; in Fig. 6, between discs 44 and 45, one or both of which may be driven; and in Fig. 7, between driven roller 46 and stationary member 48, the roller obviously being replaceable by a disc or other moving member without material change. Fig. 7 illustrates the combined rolling and rubbing action most clearly.

While this specification shows and describes certain preferred embodiments of apparatus for effecting the invention together with several modifications, it will be understood that changes may be made in form and detail without departing from the spirit of the invention within the scope of the appended claims.

I claim:

1. The process of stripping insulating coating from wire which consists in restraining the wire from material longitudinal displacement and subjecting it to a combined rolling and rubbing action.

2. The process of stripping insulating coating from wire which consists in applying a combined rolling and rubbing action to the wire and slightly flattening the wire at the region where such action is applied.

3. The process of preparing insulation coated wire for connection to other electrical elements, which consists in subjecting the wire to a combined rolling, rubbing and flattening action at the region where such connection is to be made.

4. The process of removing the insulating coating from wire which consists in passing the wire between relatively moving members adapted to effect a combined rolling and rubbing action and holding the wire in relation thereto until the insulating coating has been removed.

5. The process of removing the insulation from enamelled wire consisting in passing and restraining the wire between relatively moving members having non-uniform surface speeds, whereby a rolling and rubbing effect is produced.

6. The process of removing the insulation from enamelled wire which consists in subjecting the wire to restraint against advance and to a combined rolling, rubbing and flattening action between relatively moving surfaces having varying surface speeds.

In testimony whereof I affix my signature.

HARLEY H. HELLER.